(12) United States Patent
Yamazaki et al.

(10) Patent No.: US 10,352,249 B2
(45) Date of Patent: Jul. 16, 2019

(54) GAS TURBINE POWER GENERATION EQUIPMENT, AND DEVICE AND METHOD FOR DRYING GAS TURBINE COOLING AIR SYSTEM

(71) Applicant: MITSUBISHI HITACHI POWER SYSTEMS, LTD., Kanagawa (JP)

(72) Inventors: Shinichi Yamazaki, Tokyo (JP); Jiro Asakuno, Tokyo (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 353 days.

(21) Appl. No.: 15/111,093

(22) PCT Filed: Jan. 21, 2015

(86) PCT No.: PCT/JP2015/051577
§ 371 (c)(1),
(2) Date: Jul. 12, 2016

(87) PCT Pub. No.: WO2015/111637
PCT Pub. Date: Jul. 30, 2015

(65) Prior Publication Data
US 2016/0326963 A1 Nov. 10, 2016

(30) Foreign Application Priority Data
Jan. 27, 2014 (JP) ................. 2014-012719

(51) Int. Cl.
*F02C 7/30* (2006.01)
*F02C 7/141* (2006.01)
(Continued)

(52) U.S. Cl.
CPC ............... *F02C 7/30* (2013.01); *F01D 25/32* (2013.01); *F02C 3/107* (2013.01); *F02C 7/14* (2013.01);
(Continued)

(58) Field of Classification Search
CPC .. F01D 25/32; F02C 3/107; F02C 7/14; F02C 7/141; F02C 7/185; F02C 7/30;
(Continued)

(56) References Cited

U.S. PATENT DOCUMENTS 4,767,259 A * 8/1988 Kurosawa ............... F01P 7/026
  415/17
6,367,242 B1 4/2002 Uematsu et al.
(Continued)

FOREIGN PATENT DOCUMENTS

CN 102588116 7/2012
CN 102597462 7/2012
(Continued)

OTHER PUBLICATIONS

English Translation of Written Opinion dated Apr. 28, 2015 in corresponding International Application No. PCT/JP2015/051577.
(Continued)

*Primary Examiner* — Jesse S Bogue
(74) *Attorney, Agent, or Firm* — Wenderoth, Lind & Ponack, L.L.P.

(57) ABSTRACT

The occurrence of corrosion on the inner surfaces of pipes is to be minimized in a cooling air system of a gas turbine. Specifically, this gas turbine power generation equipment has: a gas turbine including a turbine connected to a generator, a combustor that supplies combustion gas to the turbine, and a compressor that supplies compressed air to the combustor; a cooling air system that supplies compressed air bled from the compressor to the turbine, the cooling air system being connected at a first end side to an intermediate stage or an outlet of the compressor and connected at a second end side to the turbine; and a drying air system that
(Continued)

supplies drying air into the cooling air system when the gas turbine is stopped, the drying air system being connected to the cooling air system.

6 Claims, 4 Drawing Sheets

(51) Int. Cl.
    *F02C 7/32* (2006.01)
    *F01D 25/32* (2006.01)
    *F02C 7/18* (2006.01)
    *F02C 3/107* (2006.01)
    *F02C 7/14* (2006.01)

(52) U.S. Cl.
    CPC .............. *F02C 7/141* (2013.01); *F02C 7/185* (2013.01); *F02C 7/32* (2013.01); *F05D 2210/12* (2013.01); *F05D 2220/32* (2013.01); *F05D 2260/211* (2013.01); *F05D 2260/232* (2013.01); *F05D 2260/608* (2013.01)

(58) Field of Classification Search
    CPC .... F02C 7/32; F05D 2210/12; F05D 2220/32; F05D 2260/211; F05D 2260/232; F05D 2260/608
    See application file for complete search history.

(56) References Cited

U.S. PATENT DOCUMENTS

| | | | | |
|---|---|---|---|---|
| 6,634,596 | B2* | 10/2003 | Albero | B64D 13/06 244/53 A |
| 6,644,035 | B1* | 11/2003 | Yamanaka | F01D 25/10 60/806 |
| 6,978,623 | B2* | 12/2005 | Hyakutake | F01D 21/12 415/114 |
| 7,971,438 | B2* | 7/2011 | Taylor | F01D 25/32 60/39.511 |
| 8,534,038 | B2* | 9/2013 | Kitaguchi | F01D 25/10 60/39.182 |
| 2004/0172947 | A1* | 9/2004 | Takahama | F02C 6/18 60/772 |
| 2012/0177481 | A1 | 7/2012 | Kojima et al. | |
| 2014/0208768 | A1* | 7/2014 | Bacic | F01D 5/082 60/782 |

FOREIGN PATENT DOCUMENTS

| | | |
|---|---|---|
| CN | 102953836 | 3/2013 |
| CN | 103104350 | 5/2013 |
| CN | 103195584 | 7/2013 |
| CN | 103225544 | 7/2013 |
| JP | 9-209713 | 8/1997 |
| JP | 9-329004 | 12/1997 |
| JP | 11-159306 | 6/1999 |
| JP | 2004-169618 | 6/2004 |
| JP | 2006-329071 | 12/2006 |
| JP | 2007-146787 | 6/2007 |
| JP | 2010-112274 | 5/2010 |
| JP | 2011-140880 | 7/2011 |
| JP | 2013-76356 | 4/2013 |
| JP | 2013-142357 | 7/2013 |
| JP | 2013-245604 | 12/2013 |

OTHER PUBLICATIONS

First Office Action dated Jan. 22, 2017 in corresponding Chinese Application No. 201580004049.7, with English translation.
International Search Report dated Apr. 28, 2015 in International (PCT) Application No. PCT/JP2015/051577.
Office Action dated Aug. 8, 2017 in Japanese Application No. 2014-012719, with English Translation.
Office Action dated Jan. 9, 2018 in Japanese Patent Application No. 2014-012719, with English Translation.

* cited by examiner

GAS TURBINE POWER GENERATION EQUIPMENT, AND DEVICE AND METHOD FOR DRYING GAS TURBINE COOLING AIR SYSTEM

TECHNICAL FIELD

The present invention relates to gas turbine power generation equipment, and a device and a method for drying a gas turbine cooling air system.

BACKGROUND ART

Gas turbine power generation equipment generates electrical power by connecting a generator to a gas turbine, and transmitting the driving power of the gas turbine to the generator. A gas turbine is made up of a compressor, a combustor, and a turbine. The compressor generates high temperature high pressure compressed air by compressing air that is drawn in from the air inlet. The combustor generates high temperature high pressure combustion gas by supplying fuel to the compressed air, and causing the fuel to be combusted. The turbine is configured with a plurality of turbine vanes and turbine blades disposed alternately in a passage within the casing, and by driving the turbine blades with the combustion gas supplied to the passage, the turbine shaft connected to the generator is driven in rotation. The combustion gas that has driven the turbine is released to the atmosphere as exhaust gas.

Conventionally, for example, in the gas turbine described in Patent Document 1, a cooling air system (cooling air supply means) is disclosed that extracts compressed air that has been compressed by the compressor, cools the compressed air with a heat exchanger (TCA cooler), and supplies the compressed air to the turbine blades on the turbine side, thereby cooling the turbine blades.

For example, Patent Document 2 discloses a steam turbine power generation plant using an existing control compressed air supply device in the power generation plant. The steam turbine power generation plant maintains the steam turbine and the condenser in a dry state using drying air from the control compressed air supply device.

CITATION LIST

Patent Documents

Patent Document 1: Japanese Unexamined Patent Application Publication No. 2007-146787A
Patent Document 2: Japanese Unexamined Patent Application Publication No. 2013-76356A

SUMMARY OF INVENTION

Technical Problem

In the cooling air system disclosed in Patent Document 1, carbon steel is used for the piping, so when the gas turbine is stopped for a long period of time, there is a possibility that moisture in the air will condense and generate particles of corrosion on the inner surfaces of the piping. The generation of corrosion increases in proportion to the surface area of the inner surfaces of the piping and the length of time that the gas turbine is stopped, and increases exponentially with the humidity. Also, it is not desirable that these particles of corrosion generated inside the piping be carried to the turbine side by the flow of cooling air when the gas turbine is started up after a long period of stoppage.

The present invention solves the above problem, and it is an object of the present invention to provide gas turbine power generation equipment, and a device and a method for drying a gas turbine cooling air system that are capable of minimizing the occurrence of corrosion on the inner surfaces of the piping of the gas turbine cooling air system.

Solution to Problem

In order to achieve the above object, gas turbine power generation equipment according to the present invention includes: a gas turbine including a turbine connected to a generator, a combustor that supplies combustion gas to the turbine, and a compressor that supplies compressed air to the combustor; a cooling air system that supplies compressed air bled from the compressor to the turbine, the cooling air system being connected at a first end side to an intermediate stage or an outlet of the compressor and connected at a second end side to the turbine; and a drying air system that supplies drying air into the cooling air system when the gas turbine is stopped, the drying air system being connected to the cooling air system.

According to this gas turbine power generation equipment, by supplying drying air to the cooling air system when the gas turbine is stopped, the inside of the cooling air system is dried. As a result, the occurrence of corrosion on the inner surfaces of pipes in the cooling air system can be reduced. Moreover, by supplying drying air to the cooling air system when the gas turbine is stopped, the inside of the cooling air system is dried, so it is not necessary to carry out a blow operation, and the quantity of fuel used can be reduced.

Also, in the gas turbine power generation equipment according to the present invention, the cooling air system includes a heat exchanger that cools the compressed air on the route of the cooling air system, and the drying air system is connected to the cooling air system on the turbine side of the heat exchanger.

Normally in the cooling air system of the gas turbine, at the compressor side to which the first end side of the cooling air system is connected, it is necessary that the bled compressed air be supplied without pressure loss to the turbine side. On the other hand, in the case of the turbine side to which the second end side of the cooling air system is connected, it is necessary that the quantity of air leaking from the seals and the like be reduced so that the cooled air is not unnecessarily consumed and the performance of the gas turbine is not reduced. When the CdA values (product of the flow rate coefficient Cd and the area A of the flow passage) for the compressor side at the first end side of the cooling air system and the turbine side at the second end side of the cooling air system are compared, there is a relationship in which the CdA value at the compressor side is larger and the CdA value at the turbine side is smaller. Accordingly, most of the drying air supplied to the cooling air system when the gas turbine is stopped flows towards the compressor side, which is the first end side of the cooling air system.

Therefore, as in the gas turbine power generation equipment of the present invention, by connecting the drying air system to the cooling air system on the turbine side of the heat exchanger, a greater quantity of drying air can flow to the heat exchanger, and it is possible to rapidly reduce the humidity within the heat exchanger, so the occurrence of corrosion within the heat exchanger can be reduced.

Also, in general, when the heat exchanger is provided in the cooling air system of the gas turbine, the heat exchanger is commonly provided at a position about half the total pipe length of the cooling air system. In this case, according to the gas turbine power generation equipment of the present invention, the drying air system is connected at a position on the turbine side of the total pipe length of the cooling air system, so drying air can be effectively delivered to the pipes on the compressor side from a connection point that accounts for a large proportion of the total pipe length of the cooling air system. Therefore, corrosion on the inner surfaces of the pipes can be effectively reduced in the cooling air system.

Also, in the gas turbine power generation equipment according to the present invention, the drying air system obtains drying air from a control air supply system that supplies control air into the equipment.

The control air supply system is a drive source for air operated valves disposed within the equipment, and generates dehumidified drying air. The demand for drying air from the control air supply system is small when the gas turbine is stopped, so by using this drying air in the drying air system, the drying air that is used within the equipment can be effectively used without providing a new drying air supply source.

In order to achieve the above object, a gas turbine cooling air system drying device according to the present invention is a gas turbine cooling air system drying device that dries a cooling air system that supplies compressed air bled from a compressor to a turbine, the cooling air system connecting an intermediate stage or an outlet of the compressor to the turbine in a gas turbine, wherein a drying air system is connected to the cooling air system and supplies drying air into the cooling air system.

According to this gas turbine cooling air system drying device, the inside of the cooling air system can be dried when the gas turbine is stopped by supplying drying air to the cooling air system. As a result, the occurrence of corrosion on the inner surfaces of the pipes in the cooling air system can be reduced. Moreover, by supplying drying air to the cooling air system when the gas turbine is stopped, the inside of the cooling air system is dried, so it is not necessary to carry out a blow operation, and the quantity of fuel used can be reduced.

Also, in the gas turbine cooling air system drying device according to the present invention, a heat exchanger is provided on the route of the cooling air system, and the drying air system is connected on the turbine side of the heat exchanger.

Normally in the cooling air system of the gas turbine, at the compressor side to which the first end side of the cooling air system is connected, it is necessary that the bled compressed air be supplied without pressure loss to the turbine side. On the other hand, in the case of the turbine side to which the second end side of the cooling air system is connected, it is necessary that the quantity of air leaking from the seals and the like be reduced so that the cooled air is not unnecessarily consumed and the performance of the gas turbine is not reduced. When the CdA values (product of the flow rate coefficient Cd and the area A of the flow passage) for the compressor side at the first end side of the cooling air system and the turbine side at the second end side of the cooling air system are compared, there is a relationship in which the CdA value at the compressor side is larger and the CdA value at the turbine side is smaller. Accordingly, most of the drying air supplied to the cooling air system when the gas turbine is stopped flows towards the compressor side, which is the first end side of the cooling air system.

Therefore, as in the gas turbine cooling air system drying device of the present invention, by connecting the drying air system to the cooling air system on the turbine side of the heat exchanger, a greater quantity of drying air can flow to the heat exchanger, and it is possible to rapidly reduce the humidity within the heat exchanger, so the occurrence of corrosion within the heat exchanger can be reduced.

Also, in general, when the heat exchanger is provided in the cooling air system of the gas turbine, the heat exchanger is commonly provided at a position about half the total pipe length of the cooling air system. In this case, according to the gas turbine power generation equipment of the present invention, the drying air system is connected at a position on the turbine side of the total pipe length of the cooling air system, so drying air can be effectively delivered to the pipes on the compressor side from a connection point that accounts for a large proportion of the total pipe length of the cooling air system. Therefore, the occurrence of corrosion on the inner surfaces of the pipes can be reduced in the cooling air system.

In order to achieve the above object, a gas turbine cooling air system drying method according to the present invention is a gas turbine cooling air system drying method that dries a cooling air system that supplies compressed air bled from a compressor to a turbine, the cooling air system connecting an intermediate stage or an outlet of the compressor to the turbine in a gas turbine, the method including supplying drying air into the cooling air system when the gas turbine is stopped.

According to this gas turbine cooling air system drying method, the inside of the cooling air system can be dried when the gas turbine is stopped by supplying drying air to the cooling air system. As a result, the occurrence of corrosion on the inner surfaces of the pipes in the cooling air system can be reduced. Moreover, by supplying drying air to the cooling air system when the gas turbine is stopped, the inside of the cooling air system is dried, so it is not necessary to carry out a blow operation, and the quantity of fuel used can be reduced.

Also, in the gas turbine cooling air system drying method according to the present invention, the cooling air system includes a heat exchanger on the route thereof, and the drying air is supplied on the turbine side of the heat exchanger.

Normally in the cooling air system of the gas turbine, at the compressor side to which the first end side of the cooling air system is connected, it is necessary that the bled compressed air be supplied without pressure loss to the turbine side. On the other hand, in the case of the turbine side to which the second end side of the cooling air system is connected, it is necessary that the quantity of air leaking from the seals and the like be reduced so that the cooled air is not unnecessarily consumed and the performance of the gas turbine is not reduced. When the CdA values (product of the flow rate coefficient Cd and the area A of the flow passage) for the compressor side at the first end side of the cooling air system and the turbine side at the second end side of the cooling air system are compared, there is a relationship in which the CdA value at the compressor side is larger and the CdA value at the turbine side is smaller. Accordingly, most of the drying air supplied to the cooling air system when the gas turbine is stopped flows towards the compressor side, which is the first end side of the cooling air system.

Therefore, as in the gas turbine cooling air system drying method of the present invention, by supplying drying air to the turbine side of the heat exchanger, a greater quantity of drying air can flow to the heat exchanger, and it is possible to rapidly reduce the humidity within the heat exchanger, so the occurrence of corrosion within the heat exchanger can be reduced.

Also, in general, when the heat exchanger is provided in the cooling air system of the gas turbine, the heat exchanger is commonly provided at a position about half the total pipe length of the cooling air system. In this case, according to the gas turbine power generation equipment of the present invention, the drying air system is connected at a position on the turbine side of the total pipe length of the cooling air system, so drying air can be effectively delivered to the pipes on the compressor side from a connection point that accounts for a large proportion of the total pipe length of the cooling air system. Therefore, the occurrence of corrosion on the inner surfaces of pipes can be reduced in the cooling air system.

Advantageous Effect of Invention

According to the present invention, the occurrence of corrosion on the inner surfaces of pipes in the cooling air system of the gas turbine can be reduced.

DESCRIPTION OF EMBODIMENTS

Detailed descriptions will be given below of embodiments according to the present invention on the basis of the drawings. Note that the present invention is not limited by these embodiments. In addition, the constituent elements in the embodiments described below include those that can be easily replaced by a person skilled in the art or those that are substantially the same.

Figure 1:
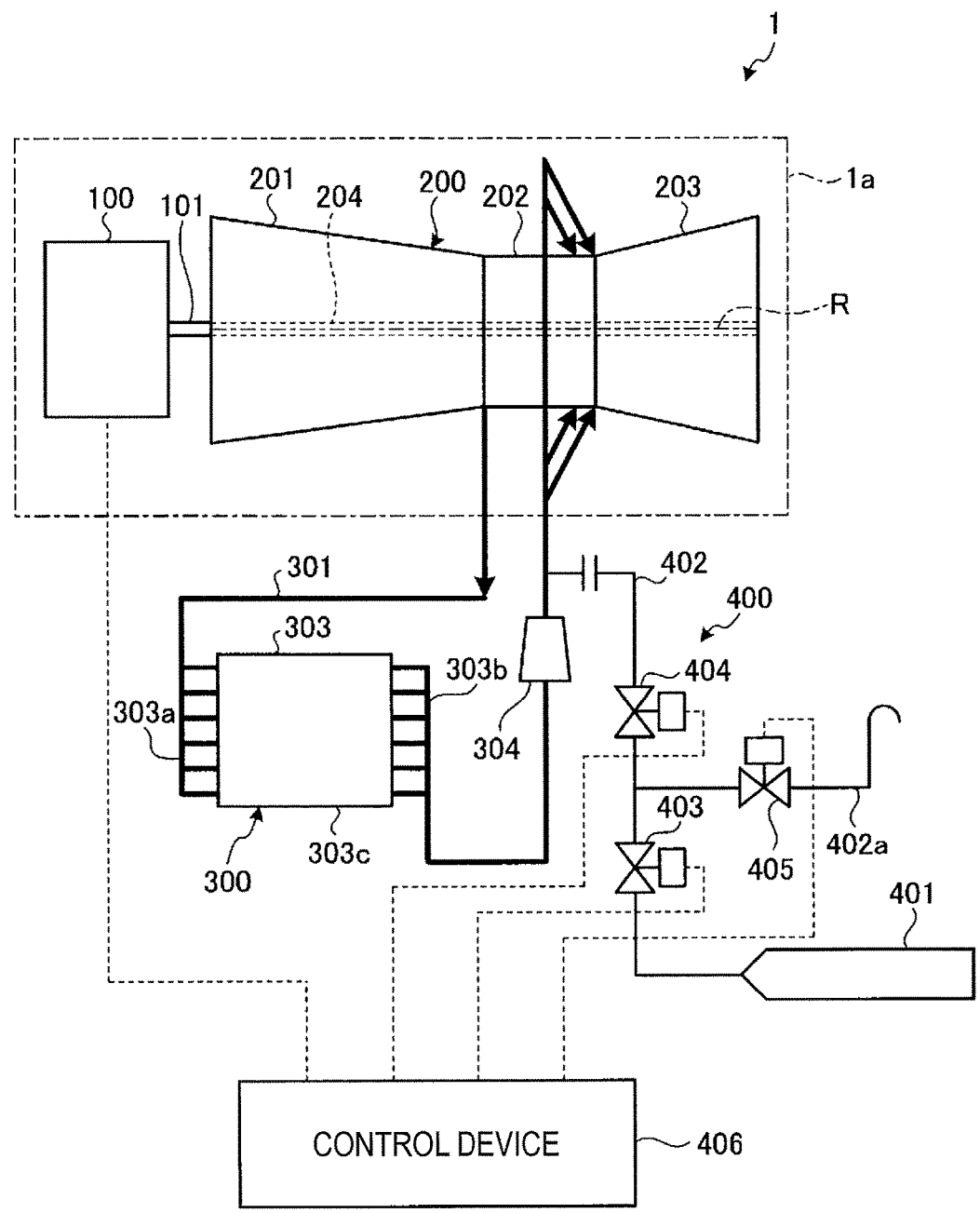
FIG. 1 is a schematic configuration diagram of gas turbine power generation equipment according to an embodiment of the present invention.
Figure 2:
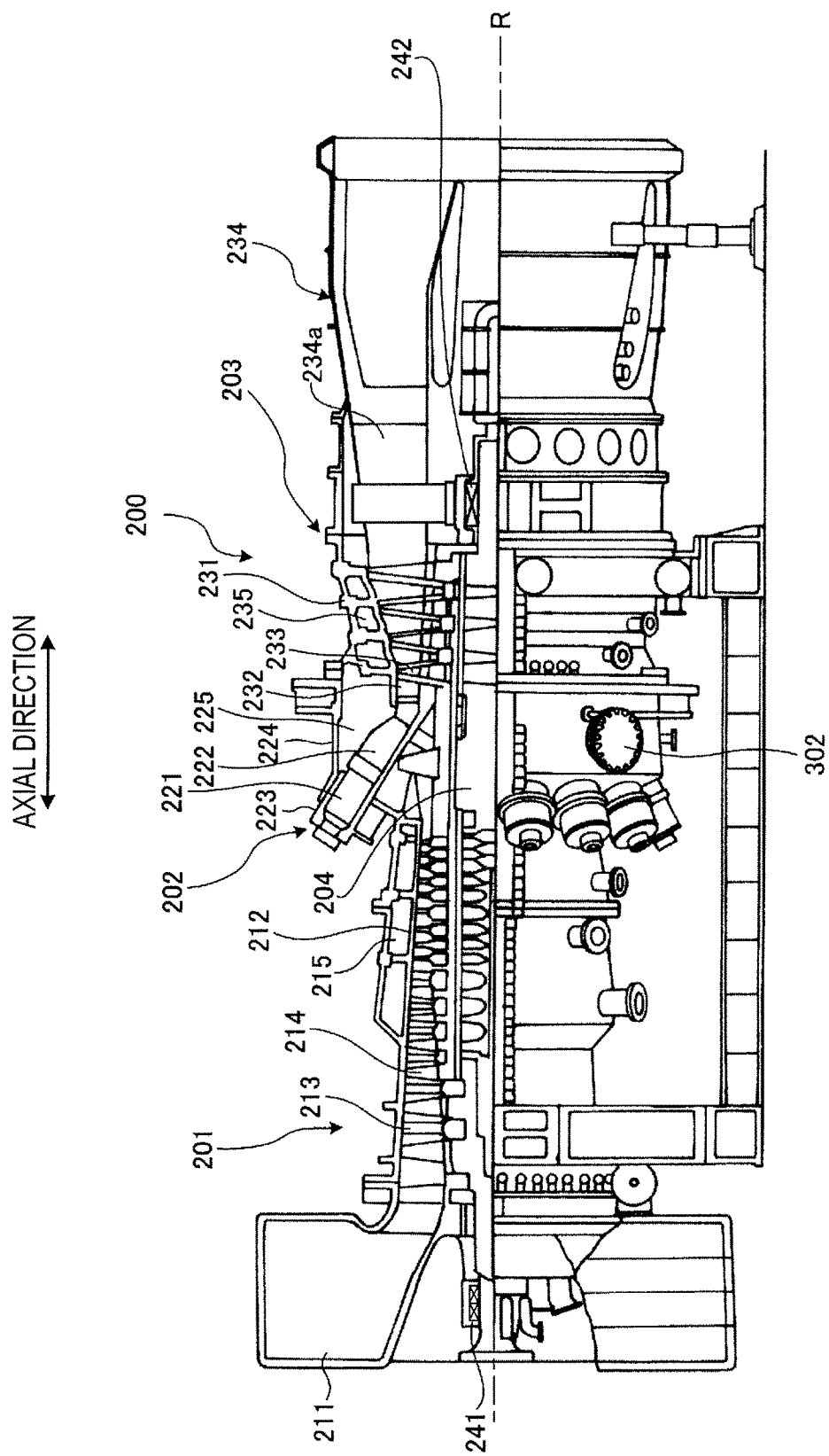
FIG. 2 is a configuration diagram of a gas turbine in the gas turbine power generation equipment according to the embodiment of the present invention.
Figure 3:
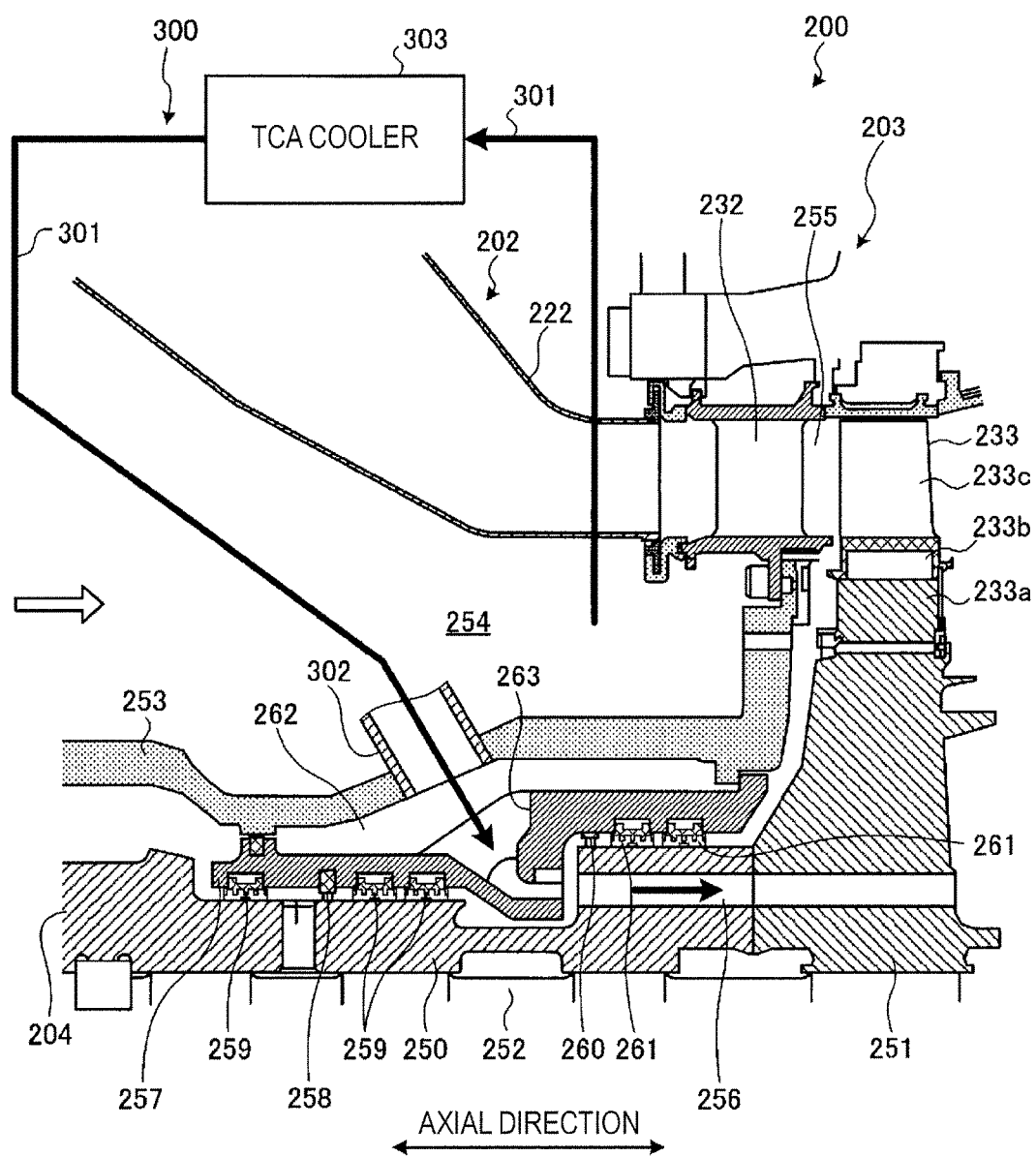
FIG. 3 is a configuration diagram of a cooling air system in the gas turbine power generation equipment according to the embodiment of the present invention.
Figure 4:
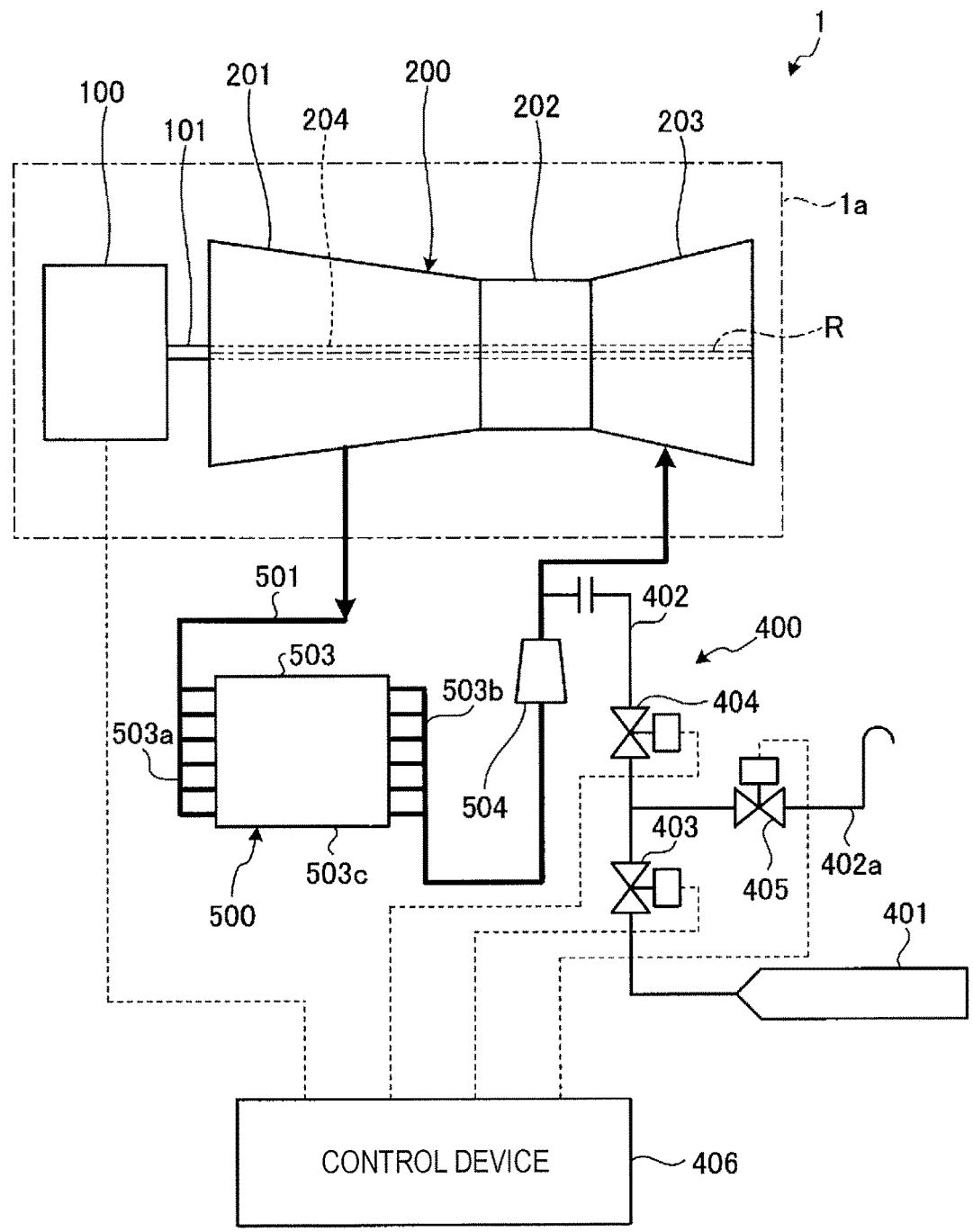
FIG. 4 is a configuration diagram of another example of a cooling air system in gas turbine power generation equipment according to the embodiment of the present invention.

FIG. 1 is a schematic configuration diagram of gas turbine power generation equipment according to the present embodiment, FIG. 2 is a configuration diagram of a gas turbine in the gas turbine power generation equipment according to the present embodiment, and FIG. 3 is a configuration diagram of a cooling air system in the gas turbine power generation equipment according to the present embodiment. FIG. 4 is a configuration diagram of another example of a cooling air system in gas turbine power generation equipment according to the present embodiment.

As illustrated in FIG. 1, gas turbine power generation equipment 1 includes a generator 100, a gas turbine 200, a cooling air system 300, and a drying air system 400.

A drive shaft 101 of the generator 100 is connected to a turbine shaft 204 of the gas turbine 200 that is described later, and power is generated by applying the rotational power of the turbine shaft 204 to the drive shaft 101. Note that the generator 100 is also used as a start-up motor that applies rotational power to the turbine shaft 204 when the gas turbine 200 is started up.

The gas turbine 200 has a compressor 201, a combustor 202, and a turbine 203. The turbine shaft 204 of the gas turbine 200 passes through the centers of the compressor 201, the combustor 202, and the turbine 203. The compressor 201, the combustor 202, and the turbine 203 are juxtaposed along an axis R of the turbine shaft 204 in that order from the front side towards the rear side of the flow of the air. Note that in the following description, the turbine axial direction refers to a direction parallel to the axis R, and the turbine circumferential direction refers to a circumferential direction about the axis R as the center.

The compressor 201 generates compressed air by compressing air. As illustrated in FIG. 2, the compressor 201 includes compressor vanes 213 and compressor blades 214 provided within a compressor casing 212 having an air inlet 211 for intaking air. A plurality of the compressor vanes 213 are juxtaposed in the turbine circumferential direction on the compressor casing 212 side. Also, a plurality of the compressor blades 214 are juxtaposed in the turbine circumferential direction on the turbine shaft 204 side. The compressor vanes 213 and the compressor blades 214 are provided alternately along the turbine axial direction.

As illustrated in FIG. 2, the combustor 202 generates high temperature high pressure combustion gas by supplying the fuel to the compressed air that has been compressed by the compressor 201. The combustor 202 includes, as combustion liners, a combustor basket 221 in which the compressed air and the fuel are mixed and combusted, a transition piece 222 that guides the combustion gas from the combustor basket 221 to the turbine 203, and an external cylinder 223 covering the outer periphery of the combustor basket 221, the external cylinder 223 forming an air passage 225 that guides the compressed air from the compressor 201 to the combustor basket 221. A plurality of the combustors 202 (for example, 16 combustors) are juxtaposed in the turbine circumferential direction along a combustor casing 224 forming a turbine compartment.

As illustrated in FIG. 2, the turbine 203 generates rotational power from the combustion gas that is combusted in the combustor 202. The turbine 203 includes turbine vanes 232 and turbine blades 233 provided within a turbine casing 231. A plurality of the turbine vanes 232 are juxtaposed in the turbine circumferential direction on the turbine casing 231 side. Also, a plurality of the turbine blades 233 are juxtaposed in the turbine circumferential direction on the turbine shaft 204 side. The turbine vanes 232 and the turbine blades 233 are provided alternately along the turbine axial direction. Also, an exhaust chamber 234 having an exhaust diffuser 234a connected to the turbine 203 is provided on the rear side of the turbine casing 231.

The turbine shaft 204 is supported at the end on the compressor 201 side by a bearing 241, and is supported at the end on the exhaust chamber 234 side by a bearing 242, and is provided so that the turbine shaft 204 can freely rotate about the axis R as the center. Also, the turbine shaft 204 is connected to the drive shaft 101 of the generator 100 at the end thereof on the compressor 201 side.

In the gas turbine 200, air taken in through the air inlet 211 of the compressor 201 passes through the plurality of compressor vanes 213 and compressor blades 214 and is compressed, thereby converting the air to high temperature high pressure compressed air. By mixing fuel and the compressed air in the combustor 202 and combusting the mixed fuel and compressed air, high temperature high pressure combustion gas is generated. Then, by passing the combustion gas through the turbine vanes 232 and the turbine blades 233 of the turbine 203, the turbine shaft 204 is driven in rotation, and rotational power is applied to the generator 100 connected to the turbine shaft 204 to generate electrical power. After driving the turbine shaft 204 in rotation, the exhaust gas passes through the exhaust diffuser 234a of the exhaust chamber 234 and is released to the atmosphere as exhaust gas.

The cooling air system 300 is provided in the gas turbine 200, and supplies compressed air bled from the compressor 201 to the turbine 203.

The following is a description of a configuration related to the cooling air system 300. As illustrated in FIG. 3, in the gas turbine 200 as described above, the turbine shaft 204 includes a plurality of turbine disks 251 integrally connected to an intermediate shaft 250 with connecting bolts 252, and is rotatably supported by the bearings 241, 242. The turbine blades 233 are mounted on the outer periphery of the turbine disks 251. The turbine blades 233 are configured from a plurality of blade root portions 233a fixed to the outer peripheral end of the turbine disk 251 along the turbine circumferential direction, a platform 233b connecting the blade root portions 233a to one another, and a plurality of blade portions 233c fixed to the outer peripheral surface of the platform 233b at equal intervals in the circumferential direction.

Also, an intermediate shaft cover 253 formed in a ring shape along the turbine circumferential direction is fitted around the outer periphery of the turbine shaft 204, and on the outer periphery of the intermediate shaft cover 253, a turbine compartment 254 is demarcated within the combustor casing 224 on the outside of the plurality of combustors 202. On the other hand, the transition piece 222 of the combustor 202 is connected to a combustion gas passage 255 formed in a ring shape along the turbine circumferential direction in the turbine 203. The plurality of turbine vanes 232 and the plurality of turbine blades 233 (blade portions 233c) are disposed alternately along the turbine axial direction in the combustion gas passage 255.

A cooling air supply hole 256 opening as an inlet on the compressor 201 side is provided along the turbine axial direction in the turbine disks 251 of the turbine shaft 204. The cooling air supply hole 256 is formed along the turbine axial direction, and is linked to a cooling hole (not illustrated on the drawings) provided within each turbine blade 233 via each turbine disk 251. Also, within the intermediate shaft cover 253, in the vicinity of the inlet to the cooling air supply hole 256, a seal ring retaining ring 257 is provided formed in a ring shape along the turbine circumferential direction. At each end in the turbine axial direction, the seal ring retaining ring 257 is fitted in close contact at the outer peripheral surface thereof with the inner periphery of the intermediate shaft cover 253, thereby partitioning a space 262 with the intermediate shaft cover 253, in the center in the turbine axial direction and along the turbine circumferential direction. Also, a plurality of seals 258, 259, 260, 261 that seal the gap between the inner peripheral surface of the seal ring retaining ring 257 and the outer peripheral surface of the turbine shaft 204 are provided on the inner peripheral surface side of the seal ring retaining ring 257. Also, the space 262 partitioned between the intermediate shaft cover 253 and the seal ring retaining ring 257 is linked to the inlet to the cooling air supply hole 256 via a through hole 263 formed in the seal ring retaining ring 257.

A first end side of a cooling air pipe 301 of the cooling air system 300 is connected to the combustor casing 224 so that the turbine compartment 254 is linked to the outside thereof. Specifically, as illustrated in FIG. 1, there is one first end side of the cooling air pipe 301, and the cooling air pipe 301 is connected to one connector 302 formed in the combustor casing 224 as illustrated in FIG. 3. Also, as illustrated in FIG. 1, a plurality of branches (four in FIG. 1) are formed in a second end side of the cooling air pipe 301, each penetrating the combustor casing 224 and mounted on the intermediate shaft cover 253, and linked to the cooling air supply hole 256 via the space 262. Also, a TCA cooler 303, which is a heat exchanger, is provided on the route of the cooling air pipe 301. The TCA cooler 303 includes an inlet header 303a connected to the first end side of the cooling air pipe 301 and an outlet header 303b connected to the second end side of the cooling air pipe 301, both provided on a heat exchanger unit 303c. The compressed air supplied from the inlet header 303a is heat-exchanged with a coolant in the heat exchanger unit 303c, and the heat-exchanged compressed air is discharged from the outlet header 303b. As illustrated in FIG. 1, normally the TCA cooler 303 is disposed outside a building 1a of the gas turbine power generation equipment 1 that contains the gas turbine 200 and the like, so the cooling air pipe 301 extends outside the building 1a and connects to the TCA cooler 303, and again returns into the building 1a from the TCA cooler 303. In addition, as illustrated in FIG. 1, the cooling air pipe 301 is provided with a filter 304 on the route thereof on the second end side of the TCA cooler 303.

When the gas turbine 200 is operating, the compressed air that has been compressed by the compressor 201 of the gas turbine 200 is supplied to the turbine compartment 254. The compressed air is guided from the turbine compartment 254 to the combustor 202, and high temperature high pressure combustion gas is generated in the combustor 202, which passes through the transition piece 222 and flows through the combustion gas passage 255 and is fed to the turbine 203. In the cooling air system 300, a portion of the compressed air supplied to the turbine compartment 254 linked to the outlet of the compressor 201 is bled from the first end side of the cooling air pipe 301, and is supplied from the second end side of the cooling air pipe 301 through the space 262 and through the through hole 263 to the cooling air supply hole 256 on the turbine 203 side, and passes through a cooling hole in each turbine blade 233. The compressed air that passes through the cooling air pipe 301 is cooled by the TCA cooler 303, foreign matter is removed by the filter 304, and the compressed air is delivered to each turbine blade 233, where the compressed air cools each turbine blade 233.

In this cooling air system 300, the cooling air pipe 301 is formed with a sufficient pipe cross-sectional area so that unnecessary pressure loss does not occur. Also, normally in the cooling air system 300 of the gas turbine 200, at the turbine compartment 254 on the compressor 201 side to which the first end side of the cooling air pipe 301 is connected, it is necessary that the bled compressed air be supplied without pressure loss to the turbine side. On the other hand, in the case of the cooling air supply hole 256 and the cooling holes of the turbine blades 233 on the turbine 203 side to which the second end side of the cooling air pipe 301 is connected, it is necessary that the quantity of air leaking from the seals and the like be reduced so that the cooled air is not unnecessarily consumed and the performance of the gas turbine is not reduced. Therefore, when the CdA values (product of the flow rate coefficient Cd and the area A of the flow passage) for the turbine compartment 254 at the first end side of the cooling air pipe 301 and for the cooling air supply hole 256 and the cooling holes of the turbine blades 233 at the second end side of the cooling air pipe 301 are compared, there is a relationship in which the CdA value at the turbine compartment 254 side is larger and the CdA value at the side of the cooling air supply hole 256 and the cooling holes of the turbine blade 233 is smaller.

In the cooling air system 300 as described above, compressed air from the outlet of the compressor 201 is bled and supplied to the turbine 203 side, but the present invention can also be applied to other cooling air systems. FIG. 4 is a schematic configuration diagram of another example of gas turbine power generation equipment according to the present embodiment, illustrating another example of a cooling air system. As illustrated in FIG. 4, a cooling air system 500 bleeds compressed air from an intermediate stage of the compressor 201 and supplies the compressed air to the turbine 203 side.

In the gas turbine 200 as described above, as illustrated in FIG. 2, the compressor 201 is provided with a compressor air bleed chamber 215 on the outside of the position of the compressor vanes 213 in the compressor casing 212. The compressor air bleed chamber 215 is linked to the inside of the compressor casing 212, and is formed in a ring shape along the turbine circumferential direction. Also, the turbine 203 is provided with a turbine vane ring cavity 235 formed in a ring shape along the turbine circumferential direction, on the outside of the position of the turbine vanes 232 in the combustor casing 224. The turbine vane ring cavity 235 is linked to cooling holes (not illustrated on the drawings) provided on the inside of each turbine vane 232.

As illustrated in FIG. 4, a first end side of a cooling air pipe 501 of the cooling air system 500 is connected to the compressor air bleed chamber 215. Also, a second end side of the cooling air pipe 501 is connected to the turbine vane ring cavity 235. Also, a TCA cooler 503, which is a heat exchanger, is provided on the route of the cooling air pipe 501. The TCA cooler 503 includes an inlet header 503a connected to the first end side of the cooling air pipe 501 and an outlet header 503b connected to the second end side of the cooling air pipe 501, both provided on a heat exchanger unit 503c. A cooling object supplied from the inlet header 503a is heat-exchanged in the heat exchanger unit 503c, and the heat-exchanged cooling object is discharged from the outlet header 503b. As illustrated in FIG. 4, in order to increase the heat exchange efficiency, the TCA cooler 503 is disposed outside the building 1a of the gas turbine power generation equipment 1 that contains the gas turbine 200 and the like, so the cooling air pipe 501 extends outside the building 1a and connects to the TCA cooler 503. In addition, as illustrated in FIG. 4, the cooling air pipe 501 is provided with a filter 504 on the route thereof on the second end side of the TCA cooler 503. This filter 504 is also disposed outside the building 1a of the gas turbine power generation equipment 1.

Therefore, in the cooling air system 500, compressed air compressed by the compressor 201 of the gas turbine 200 is bled from the compressor air bleed chamber 215 to the first end of the cooling air pipe 501, and passes from the second end side of the cooling air pipe 501 through the turbine vane ring cavity 235 to cooling holes in each turbine vane 232. The compressed air that passes through the cooling air pipe 501 is cooled by the TCA cooler 503, foreign matter brought in from the compressor air bleed chamber 215 is removed by the filter 504, and the compressed air is delivered to each turbine vane 232, where the compressed air cools each turbine vane 232.

In this cooling air system 500, the cooling air pipe 501 is formed with a sufficient pipe cross-sectional area so that unnecessary pressure loss does not occur. Also, normally in the cooling air system 500 of the gas turbine 200, at the compressor air bleed chamber 215 on the compressor 201 side to which the first end side of the cooling air pipe 501 is connected, it is necessary that the bled compressed air be supplied without pressure loss to the turbine side. On the other hand, in the case of the cooling holes of the turbine vanes 232 on the turbine 203 side to which the second end side of the cooling air pipe 501 is connected, it is necessary that the quantity of air leaking from the seals and the like be reduced so that the cooled air is not unnecessarily consumed and the performance of the gas turbine is not reduced. Therefore, when the CdA values (product of the flow rate coefficient Cd and the area A of the flow passage) for the compressor air bleed chamber 215 at the first end side of the cooling air pipe 501 and for the cooling holes of the turbine vanes 232 at the second end side of the cooling air pipe 501 are compared, there is a relationship in which the CdA value at the compressor air bleed chamber 215 side is larger and the CdA value at the side of the cooling holes of the turbine vanes 232 is smaller.

The drying air system 400 is a gas turbine cooling air system drying device that supplies drying air into the cooling air system 300, 500. As illustrated in FIGS. 1 and 4, in the drying air system 400, a drying air pipe 402 connected to a drying air supply source 401 is connected to the cooling air pipe 301, 501. The drying air supply source 401 may be any source that generates dry air, and in the present embodiment the drying air is obtained from a control air supply system that supplies control air into the equipment. Although not illustrated on the drawings, the control air supply system is a drive source for air operated valves disposed within the power generation equipment. The control air supply system generates drying air by compressing air with a compressor, and dehumidifying the compressed air with a dehumidifier. In the control air supply system, the drying air is accumulated in an air tank, from which the drying air is supplied to various locations within the power generation equipment (for example, the building 1a, a boiler, a water treatment plant), where the drying air is used for driving various types of air operated valve.

Also, as illustrated in FIGS. 1 and 4, preferably the drying air pipe 402 of the drying air system 400 is connected to the second end side of the cooling air pipe 301, 501 of the cooling air system 300, 500 on the turbine 203 side of the TCA cooler 303, 503 being a heat exchanger. In addition, preferably the drying air pipe 402 of the drying air system 400 is connected to the second end side of the cooling air pipe 301, 501 of the cooling air system 300, 500 on the turbine 203 side of the filter 304, 504.

The drying air pipe 402 of the drying air system 400 is connected to the cooling air pipe 301, 501, and is configured so that when necessary drying air can be supplied from the drying air supply source 401 to the cooling air system 300, 500. Therefore an on-off valve is provided on the drying air pipe 402. There may be one on-off valve, but for safety preferably there are a first on-off valve 403 and a second on-off valve 404 from the drying air supply source 401 side towards the cooling air system 300, 500. A blow pipe 402a that is open to the atmosphere is connected to the drying air pipe 402 between the first on-off valve 403 and the second on-off valve 404. The blow pipe 402a is opened and closed by a blow on-off valve 405.

Also, the drying air system 400 is used when the gas turbine 200 is stopped (mainly when the turbine is stationary or turning). In other words, when the gas turbine 200 is stopped, the on-off valves, namely the first on-off valve 403 and the second on-off valve 404, are in the open state, and the blow on-off valve 405 is in the closed state. Then drying air is supplied to the cooling air pipe 301, 501 from the drying air supply source 401 via the drying air pipe 402. Therefore, the drying air is fed within the cooling air system 300, 500, and the inside of the cooling air system 300, 500 is dried. As a result, the occurrence of corrosion on the inner surfaces of the cooling air pipe 301, 501 of the cooling air system 300, 500 is minimized. Note that the timing of supply of the drying air to the cooling air system 300, 500 may be when three days have passed after the gas turbine 200 is stopped. If three or more days have passed after the gas turbine 200 has stopped, the air temperature within the cooling air pipe 301, 501 falls to the dew point or lower, so there is a high possibility that the moisture within the air will condense.

Note that the drying air system 400 may be configured so that the drying air system 400 is automatically activated when the gas turbine 200 has been stopped or when three days have passed after the gas turbine 200 has been stopped. In this case the drying air system 400 includes a control device 406 that detects stopping and operation of the gas turbine 200, and controls the first on-off valve 403, the second on-off valve 404, and the blow on-off valve 405. In order to detect stoppage of the gas turbine 200, for example, the control device 406 is connected to a control device (not illustrated on the drawings) of the gas turbine 200. Also, the control device 406 is connected to the first on-off valve 403, the second on-off valve 404, and the blow on-off valve 405 in order to control the first on-off valve 403, the second on-off valve 404, and the blow on-off valve 405. Also, the control device 406 controls the first on-off valve 403, the second on-off valve 404, and the blow on-off valve 405 to be closed during operation of the gas turbine 200. Also, when the gas turbine 200 is stopped, the control device 406 controls the first on-off valve 403 and the second on-off valve 404 to be opened in that order with the blow on-off valve 405 controlled to remain closed. Also, when the gas turbine 200 is operating, if the first on-off valve 403 and the second on-off valve 404 are not in the closed state, the control device 406 controls the blow on-off valve 405 to be in the open state.

In other words, the gas turbine power generation equipment 1 according to the present embodiment includes: the gas turbine 200 provided with the turbine 203 connected to the generator 100, the combustor 202 that supplies combustion gas to the turbine 203, and the compressor 201 that supplies compressed air to the combustor 202; the cooling air system 300, 500 that supplies compressed air bled from the compressor 201 to the turbine 203, the cooling air system 300, 500 being connected at the first end side to an intermediate stage or the outlet of the compressor 201 and connected at the second end side to the turbine 203; and the drying air system 400 that supplies drying air into the cooling air system 300, 500 when the gas turbine 200 is stopped, the drying air system 400 being connected to the cooling air system 300, 500.

According to this gas turbine power generation equipment 1, by supplying drying air to the cooling air system 300, 500 when the gas turbine 200 is stopped, the inside of the cooling air system 300, 500 is dried. As a result, the occurrence of corrosion on the inner surfaces of the cooling air pipe 301, 501 of the cooling air system 300, 500 can be minimized.

When the gas turbine 200 is stopped for a long period of time (for example, 30 days or more), a blowing operation for the cooling air system 300, 500 under no load of the gas turbine 200 can be considered with the object of discharging corrosion on the inner surfaces of the cooling air pipe 301, 501 of the cooling air system 300, 500, but this blowing operation consumes fuel not associated with power generation. According to the gas turbine power generation equipment 1 of the present embodiment, by supplying drying air to the cooling air system 300, 500 when the gas turbine 200 is stopped, the inside of the cooling air system 300, 500 is dried and the occurrence of corrosion is minimized, so it is not necessary to carry out the blow operation, and the quantity of fuel used can be reduced.

Also, in the gas turbine power generation equipment 1 according to the present embodiment, the drying air system 400 is connected to the cooling air system 300, 500 at the second end side.

In the cooling air system 300, the CdA value at the opening of the connection between the cooling air pipe 301 and the combustor casing 224, which is at the first end side of the cooling air pipe 301, is large, and the CdA value at the side of the cooling holes of the turbine blades 233 which is connected to the second end side of the cooling air pipe 301 is small, so the drying air mostly flows towards the combustor casing 224 side, which is the first end side of the cooling air pipe 301. Also, in the cooling air system 500, the CdA value at the compressor air bleed chamber 215 side, which is at the first end side of the cooling air pipe 501, is large, and the CdA value at the side of the cooling holes of the turbine vanes 232, which is connected to the second end side of the cooling air pipe 501, is small, so the drying air mostly flows towards the compressor air bleed chamber 215 side, which is the first end side of the cooling air pipe 501. Therefore, by connecting the drying air system 400 to the second end side of the cooling air system 300, 500 (preferably to the second end of the cooling air pipe 301, 501), as in the gas turbine power generation equipment 1 according to the present embodiment, the whole atmosphere of the cooling air system 300, 500 can be efficiently replaced with drying air, so a significant effect of reduction in the occurrence of corrosion on the inner surfaces of the cooling air pipe 301, 501 of the cooling air system 300, 500 can be obtained.

Also, in the gas turbine power generation equipment 1 according to the present embodiment, the TCA cooler (heat exchanger) 303, 503 that cools the compressed air is provided on the route of the cooling air system 300, 500, and the drying air system 400 is connected to the cooling air system 300, 500 on the turbine 203 side of the TCA cooler 303, 503.

In the cooling air system 300, the CdA value at the opening of the connection between the cooling air pipe 301 and the combustor casing 224, which is at the first end side of the cooling air pipe 301, is large, and the CdA value at the side of the cooling holes of the turbine blades 233, which is connected to the second end side of the cooling air pipe 301, is small, so the drying air mostly flows towards the combustor casing 224 side, which is the first end side of the cooling air pipe 301. Also, in the cooling air system 500, the CdA value at the compressor air bleed chamber 215 side, which is at the first end side of the cooling air pipe 501, is large, and the CdA value at the side of the cooling holes of the turbine vanes 232, which is connected to the second end side of the cooling air pipe 501, is small, so the drying air mostly flows towards the compressor air bleed chamber 215 side, which is the first end side of the cooling air pipe 501. Therefore, by connecting the drying air system 400 to the cooling air system 300, 500 on the turbine 203 side of the TCA cooler 303, 503, as in the gas turbine power generation equipment 1 according to the present embodiment, the whole atmosphere of the cooling air system 300, 500 can be efficiently replaced with drying air, so a significant effect of reduction in the occurrence of corrosion on the inner surfaces of the cooling air pipe 301, 501 of the cooling air system 300, 500 can be obtained. Moreover, according to the gas turbine power generation equipment 1, by connecting the drying air system 400 to the cooling air system 300, 500 on the turbine 203 side of the TCA cooler 303, 503, a greater quantity of drying air can flow to the TCA cooler 303, 503, and it is possible to rapidly reduce the humidity within the TCA cooler 303, 503, so the occurrence of corrosion within the TCA cooler 303, 503 can be reduced.

Also, in general, when the TCA cooler 303, 503 is provided on the cooling air pipe 301, 501 of the gas turbine 200, the TCA cooler 303, 503 is commonly provided at a position about half the total pipe length of the cooling air pipe 301, 501. In this case, according to the gas turbine power generation equipment 1 of the present embodiment, the drying air system 400 is connected at a position on the turbine 203 side (the second end side) of the total pipe length of the cooling air pipe 301, 501, so drying air can be effectively delivered to the pipes on the compressor 201 side from a connection point that accounts for a large proportion of the total pipe length of the cooling air pipe 301, 501. Therefore, the occurrence of corrosion on the inner surfaces of the cooling air pipe 301, 501 can be effectively minimized.

Also, in the gas turbine power generation equipment 1 according to the present embodiment, the filter 304, 504 is provided on the route of the cooling air system 300, 500 to remove foreign matter from the compressed air, and the drying air system 400 is connected to the cooling air system 300, 500 on the turbine 203 side of the filter 304, 504.

As stated previously, most of the drying air flows towards the compressor air bleed chamber 215 side, which is the first end side of the cooling air pipe 501. Therefore, by connecting the drying air system 400 to the cooling air system 300, 500 on the turbine 203 side of the filter 304, 504, as in the gas turbine power generation equipment 1 according to the present embodiment, a greater quantity of drying air can flow through the whole of the cooling air system 300, 500, so a significant effect of reduction in the occurrence of corrosion on the inner surfaces of the cooling air pipe 301, 501 of the cooling air system 300, 500 can be obtained. Moreover, according to the gas turbine power generation equipment 1, a greater quantity of drying air can flow through the filter 304, 504, so the occurrence of corrosion in the filter 304, 504 can be reduced.

Also, in the gas turbine power generation equipment 1 according to the present embodiment, the drying air system 400 obtains drying air from the control air supply system that supplies control air into the equipment.

The control air supply system is a drive source for air operated valves disposed within the equipment, and generates dehumidified drying air. The demand for drying air from the control air supply system is small when the gas turbine 200 is stopped, so by using this drying air in the drying air system 400, the drying air that is used within the equipment can be effectively used without providing a new drying air supply source.

REFERENCE SIGNS LIST

1 Gas turbine power generation equipment
100 Generator
200 Gas turbine
201 Compressor
203 Turbine
300, 500 Cooling air system
301, 501 Cooling air pipe
303, 503 TCA cooler (heat exchanger)
400 Drying air system

The invention claimed is:

1. Gas turbine power generation equipment comprising:
a gas turbine including
a turbine connected to a generator,
a combustor that supplies combustion gas to the turbine, and
a compressor that supplies compressed air to the combustor;
a cooling air system that supplies compressed air bled from the compressor to the turbine and passes the compressed air through a cooling hole of a turbine blade, the cooling air system being connected at a first end side to an intermediate stage or an outlet of the compressor and connected at a second end side to the turbine,
the cooling air system including a heat exchanger that cools the compressed air bled from the compressor;
a drying air system that supplies drying air into the cooling air system when the gas turbine is stopped, the drying air system being connected to the cooling air system; and
a filter disposed between the heat exchanger of the cooling air system and the turbine,
wherein the drying air system is connected to the cooling air system on a turbine side of the filter, and the drying air system has a first on-off valve, a second on-off valve, a drying air pipe connected therebetween, and a third on-off valve disposed on the drying air pipe.

2. The gas turbine power generation equipment according to claim 1, wherein in the drying air system, drying air is acquired from a control air supply system that supplies control air into the equipment.

3. The gas turbine power generation equipment according to claim 1, wherein in the drying air system, drying air is acquired from a control air supply system that supplies control air into the equipment.

4. A gas turbine cooling air system drying device that dries a cooling air system that supplies compressed air bled from a compressor via a heat exchanger on the route of the cooling air system to a turbine and passes the compressed air through a cooling hole of a turbine blade, the cooling air system connecting an intermediate stage or an outlet of the compressor to the turbine in a gas turbine, the gas turbine cooling air system drying device comprising:
a drying air system that supplies drying air into the cooling air system, the drying air system being connected to the cooling air system; and
a filter disposed between the heat exchanger of the cooling air system and the turbine,
wherein the drying air system is connected to the cooling air system on a turbine side of the filter, and the drying air system has a first on-off valve, a second on-off valve, a drying air pipe connected therebetween, and a third on-off valve disposed on the drying air pipe.

5. A gas turbine cooling air system drying method for drying a cooling air system that supplies compressed air bled from a compressor via a heat exchanger on the route of the cooling air system to a turbine and passes the compressed air through a cooling hole of a turbine blade, the cooling air system connecting an intermediate stage or an outlet of the compressor to the turbine in a gas turbine, the method comprising:

supplying drying air into the cooling air system when the gas turbine is stopped, wherein a filter is disposed between the heat exchanger of the cooling air system and the turbine, and the drying air system is connected to the cooling air system on a turbine side of the filter, and the drying air system has a first on-off valve, a second on-off valve, a drying air pipe connected therebetween, and a third on-off valve disposed on the drying air pipe.

6. The gas turbine cooling air system drying method according to claim 5, wherein the drying air is supplied on the turbine side of the heat exchanger.

* * * * *